US012007516B2

(12) United States Patent
Dorrington et al.

(10) Patent No.: US 12,007,516 B2
(45) Date of Patent: Jun. 11, 2024

(54) GEOLOGICAL FEATURE SEARCH ENGINE

(71) Applicant: Schlumberger Technology Corporation, Sugar Land, TX (US)

(72) Inventors: Tracy Dorrington, Houston, TX (US); Chiao-Fang Hsu, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 583 days.

(21) Appl. No.: 15/734,081

(22) PCT Filed: May 29, 2019

(86) PCT No.: PCT/US2019/034232
§ 371 (c)(1),
(2) Date: Dec. 1, 2020

(87) PCT Pub. No.: WO2019/236339
PCT Pub. Date: Dec. 12, 2019

(65) Prior Publication Data
US 2021/0223427 A1    Jul. 22, 2021

Related U.S. Application Data

(60) Provisional application No. 62/681,632, filed on Jun. 6, 2018.

(51) Int. Cl.
*G01V 1/30* (2006.01)
*G01V 1/34* (2006.01)
(Continued)

(52) U.S. Cl.
CPC .............. *G01V 1/345* (2013.01); *G01V 1/306* (2013.01); *G06F 16/535* (2019.01); *G06F 16/5854* (2019.01); *G06N 3/04* (2013.01)

(58) Field of Classification Search
CPC .......... G01V 1/345; G01V 1/306; G01V 1/30; G01V 2210/64; G06F 16/535;
(Continued)

(56) References Cited

U.S. PATENT DOCUMENTS

2018/0106917 A1    4/2018  Osypov et al.

FOREIGN PATENT DOCUMENTS

EP         2677347 A2    12/2013
EP         2711893 A1     3/2014
(Continued)

OTHER PUBLICATIONS

Alaudah et al., Structure Label Prediction Using Similarity-Based Retrieval and Weakly Supervised Label Mapping, Jan.-Feb. 2018, Geophysics, vol. 84, No. 1, pp. V67-V79 (Year: 2018).*
(Continued)

*Primary Examiner* — Jeffrey P Aiello

(57) ABSTRACT

A computer-implemented method includes receiving a geological feature search query identifying one or more geological features, executing, based on receiving the geological feature search query, a search of database storing a plurality of seismic data images. The seismic data images are labeled with geological features present in each of the plurality of seismic data images as part of a machine learning process. The method further includes determining, based on executing the search, search results, wherein the search results identify one more of the plurality of seismic data images having the one or more geological features identified in the geological feature search query, and outputting information regarding the search results.

19 Claims, 8 Drawing Sheets

(51) Int. Cl.
  *G06F 16/535* (2019.01)
  *G06F 16/583* (2019.01)
  *G06N 3/04* (2023.01)
(58) Field of Classification Search
  CPC .... G06F 16/5854; G06F 16/54; G06F 16/587; G06N 3/04; G06N 3/02; G06T 2207/30181
  USPC ........... 73/152.02, 1.85, 152.01; 166/250.01, 166/369, 250.16, 250.02; 175/50, 24, 58; 345/419; 367/73, 38, 21, 25, 14, 43; 382/109, 113, 154, 159, 181; 700/83; 702/16, 14, 17, 6, 11, 2, 13, 18, 9, 188, 702/189, 1, 187, 181, 127, 194, 7; 703/2, 703/10
  See application file for complete search history.

(56) References Cited

FOREIGN PATENT DOCUMENTS

| | | |
|---|---|---|
| WO | 2017079178 A1 | 5/2017 |
| WO | 2018026995 A1 | 2/2018 |
| WO | 2018075049 A1 | 4/2018 |

OTHER PUBLICATIONS

Huang et al., A Scalable Deep Learning Platform for Identifying Geologic Features from Seismic Attributes, Mar. 2017, The Leading Edge, pp. 249-256 (Year: 2017).*
Mary M. Poulton, Neural Networks as an Intelligence Amplification Tool: A Review of Applications, May-Jun. 2002, Geophysics, vol. 67, No. 3, pp. 979-993 (Year: 2002).*
Volodymyr Mnih, Nicolas Heess, Alex Graves, Koray Kavukcuoglu, Recurrent Models of Visual Attention, NIPS, 2014. (9 pages).
Maxime Oquab, Leon Bottou, Ivan Laptev, Josef Sivic, Is object localization for free?—Weakly-supervised learning with convolutional neural networks, CVPR, 2015 (10 pages).
Mircea Cimpoi, Subhransu Maji, Andrea Vedaldi, Deep Filter Banks for Texture Recognition and Segmentation, CVPR, 2015 (9 pages).
Zhe Cao, Tomas Simon, Shih-En Wei, and Yaser Sheikh, Realtime Multi-Person 2D Pose Estimation using Part Affinity Fields, CVPR, 2017 (9 pages).
Leonid Pishchulin, Eldar Insafutdinov, Siyu Tang, Bjoern Andres, Mykhaylo Andriluka, Peter Gehler, and Bernt Schiele, Deepcut: Joint subset partition and labeling for multi person pose estimation, CVPR, 2016 (15 pages).
Shih-En Wei, Varun Ramakrishna, Takeo Kanade, and Yaser Sheikh, Convolutional pose machines, CVPR, 2016.
Alejandro Newell, Kaiyu Yang, and Jia Deng, Stacked hourglass networks for human pose estimation, ECCV, 2016 (17 pages).
Tomas Pfister, James Charles, and Andrew Zisserman, Flowing convnets for human pose estimation in videos, ICCV, 2015. (13 pages).
Jonathan J. Tompson, Arjun Jain, Yann LeCun, Christoph Bregler, Joint training of a convolutional network and a graphical model for human pose estimation, NIPS, 2014 (9 pages).
Karel Lenc, Andrea Vedaldi, Understanding image representations by measuring their equivariance and equivalence, CVPR, 2015 (9 pages).
Anh Nguyen, Jason Yosinski, Jeff Clune, Deep Neural Networks are Easily Fooled:High Confidence Predictions for Unrecognizable Images, CVPR, 2015 (10 pages).
Aravindh Mahendran, Andrea Vedaldi, Understanding Deep Image Representations by Inverting Them, CVPR, 2015 (9 pages).
Bolei Zhou, Aditya Khosla, Agata Lapedriza, Aude Oliva, Antonio Torralba, Object Detectors Emerge in Deep Scene CNNs, ICLR, 2015 (12 pages).
Alexey Dosovitskiy, Thomas Brox, Inverting Visual Representations with Convolutional Networks, arXiv, 2015 (15 pages).
Matthrew Zeiler, Rob Fergus, Visualizing and Understanding Convolutional Networks, ECCV, 2014 (14 pages).
Andrej Karpathy, Li Fei-Fei, Deep Visual-Semantic Alignments for Generating Image Description, CVPR, 2015 (17 pages).
Subhashini Venugopalan, Huijuan Xu, Jeff Donahue, Marcus Rohrbach, Raymond Mooney, Kate Saenko, Translating Videos to Natural Language Using Deep Recurrent Neural Networks, NAACL-HLT, 2015 (11 pages).
Xinlei Chen, C. Lawrence Zitnick, Mind"s Eye: A Recurrent Visual Representation for Image Caption Generation, CVPR 2015 (10 pages).
Hao Fang, Saurabh Gupta, Forrest Iandola, Rupesh Srivastava, Li Deng, Piotr Dollar, Jianfeng Gao, Xiaodong He, Margaret Mitchell, John C. Platt, C. Lawrence Zitnick, Geoffrey Zweig, From Captions to Visual Concepts and Back, CVPR, 2015 (10 pages).
Kelvin Xu, Jimmy Lei Ba, Ryan Kiros, Kyunghyun Cho, Aaron Courville, Ruslan Salakhutdinov, Richard S. Zemel, Yoshua Bengio, Show, Attend, and Tell: Neural Image Caption Generation with Visual Attention, arXiv:1502.03044 / ICML 2015 (22 pages).
Remi Lebret, Pedro O. Pinheiro, Ronan Collobert, Phrase-based Image Captioning, arXiv:1502.03671 / ICML 2015 (9 pages).
Junhua Mao, Wei Xu, Yi Yang, Jiang Wang, Zhiheng Huang, Alan L. Yuille, Learning like a Child: Fast Novel Visual Concept Learning from Sentence Descriptions of Images, arXiv:1504.06692, Oct. 2, 2015 (10 pages).
Jacob Devlin, Saurabh Gupta, Ross Girshick, Margaret Mitchell, C. Lawrence Zitnick, Exploring Nearest Neighbor Approaches for Image Captioning, arXiv:1505.04467, May 17, 2015 (6 pages).
Jacob Devlin, Hao Cheng, Hao Fang, Saurabh Gupta, Li Deng, Xiaodong He, Geoffrey Zweig, Margaret Mitchell, Language Models for Image Captioning: The Quirks and What Works, arXiv:1505.01809, Oct. 14, 2015 (6 pages).
Qi Wu, Chunhua Shen, Anton van den Hengel, Lingqiao Liu, Anthony Dick, Image Captioning with an Intermediate Attributes Layer, arXiv:1506.01144, Jun. 6, 2015 (12 pages).
Grzegorz Chrupala, Akos Kadar, Afra Alishahi, Learning language through pictures, arXiv:1506.03694, Jun. 19, 2015 (10 pages).
Kyunghyun Cho, Aaron Courville, Yoshua Bengio, Describing Multimedia Content using Attention-based Encoder-Decoder Networks, arXiv:1507.01053, Jul. 4, 2015 (12 pages).
Jack Hessel, Nicolas Savva, Michael J. Wilber, Image Representations and New Domains in Neural Image Captioning, arXiv:1508.02091, Aug. 9, 2015 (11 pages).
Ting Yao, Tao Mei, and Chong-Wah Ngo, "Learning Query and Image Similarities with Ranking Canonical Correlation Analysis", ICCV, 2015 (9 pages).
Jeff Donahue, Lisa Anne Hendricks, Sergio Guadarrama, Marcus Rohrbach, Subhashini Venugopalan, Kate Saenko, Trevor Darrell, Long-term Recurrent Convolutional Networks for Visual Recognition and Description, CVPR, 2015 (14 pages).
Subhashini Venugopalan, Huijuan Xu, Jeff Donahue, Marcus Rohrbach, Raymond Mooney, Kate Saenko, Translating Videos to Natural Language Using Deep Recurrent Neural Networks, arXiv:1412.4729, Apr. 30, 2015 (11 pages).
Yingwei Pan, Tao Mei, Ting Yao, Houqiang Li, Yong Rui, Joint Modeling Embedding and Translation to Bridge Video and Language, arXiv:1505.01861, Jun. 4, 2015, (10 pages).
Subhashini Venugopalan, Marcus Rohrbach, Jeff Donahue, Raymond Mooney, Trevor Darrell, Kate Saenko, Sequence to Sequence—Video to Text, arXiv:1505.00487, Oct. 19, 2015 (9 pages).
Li Yao, Atousa Torabi, Kyunghyun Cho, Nicolas Ballas, Christopher Pal, Hugo Larochelle, Aaron Courville, Describing Videos by Exploiting Temporal Structure, arXiv:1502.08029, Oct. 1, 2015 (23 pages).
Anna Rohrbach, Marcus Rohrbach, Bernt Schiele, The Long-Short Story of Movie Description, arXiv:1506.01698, Jun. 4, 2015 (16 pages).
International Search Report and Written Opinion issued in the PCT Application PCT/US2019/034232, dated Sep. 3, 2019 (11 pages).
Yukun Zhu, Ryan Kiros, Richard Zemel, Ruslan Salakhutdinov, Raquel Urtasun, Antonio Torralba, Sanja Fidler, Aligning Books and

(56) References Cited

OTHER PUBLICATIONS

Movies: Towards Story-like Visual Explanations by Watching Movies and Reading Books, arXiv:1506.06724, Jun. 22, 2015 (23 pages).
Dotan Kaufman, Gil Levi, Tal Hassner, Lior Wolf, Temporal Tessellation for Video Annotation and Summarization, arXiv:1612.06950, Apr. 14, 2017 (11 pages).
Stanislaw Antol, Aishwarya Agrawal, Jiasen Lu, Margaret Mitchell, Dhruv Batra, C. Lawrence Zitnick, Devi Parikh, VQA: Visual Question Answering, CVPR, Oct. 27, 2016 (25 pages).
Mateusz Malinowski, Marcus Rohrbach, Mario Fritz, Ask Your Neurons: A Neural-based Approach to Answering Questions about Images, arXiv:1505.01121, Oct. 1, 2015 (13 pages).
Mengye Ren, Ryan Kiros, Richard Zemel, Image Question Answering: A Visual Semantic Embedding Model and a New Dataset, arXiv:1505.02074, Nov. 29, 2015 (12 pages).
Hauyuan Gao, Junhua Mao, Jie Zhou, Zhiheng Huang, Lei Wang, Wei Xu, Are You Talking to a Machine Dataset and Methods for Multilingual Image Question Answering, arXiv:1505.05612, Nov. 2, 2015 (10 pages).
Hyeonwoo Noh, Paul Hongsuck Seo, and Bohyung Han, Image Question Answering using Convolutional Neural Network with Dynamic Parameter Prediction, arXiv:1511.05765, Nov. 18, 2015 (9 pages).
Yang, Z., He, X., Gao, J., Deng, L., Smola, A. (2015). Stacked Attention Networks for Image Question Answering. arXiv:1511.02274, Jan. 26, 2016 (11 pages).
Xiong, Caiming, Stephen Merity, and Richard Socher. "Dynamic Memory Networks for Visual and Textual Question Answering." arXiv:1603.01417 (2016) (10 pages).
Jin-Hwa Kim, Sang-Woo Lee, Dong-Hyun Kwak, Min-Oh Heo, Jeonghee Kim, Jung-Woo Ha, Byoung-Tak Zhang, Multimodal Residual Learning for Visual QA, arXiv:1606:01455, Aug. 31, 2016 (13 pages).
Akira Fukui, Dong Huk Park, Daylen Yang, Anna Rohrbach, Trevor Darrell, and Marcus Rohrbach, Multimodal Compact Bilinear Pooling for Visual Question Answering and Visual Grounding, arXiv:1606.01847, Sep. 24, 2016 (12 pages).
Hyeonwoo Noh and Bohyung Han, Training Recurrent Answering Units with Joint Loss Minimization for VQA, arXiv:1606.03647, Sep. 30, 2016 (10 pages).
Jin-Hwa Kim, Kyoung Woon On, Jeonghee Kim, Jung-Woo Ha, Byoung-Tak Zhang, Hadamard Product for Low-rank Bilinear Pooling, arXiv:1610.04325, May 26, 2017 (14 pages).
Aäron van den Oord, Nal Kalchbrenner, Oriol Vinyals, Lasse Espeholt, Alex Graves, Koray Kavukcuoglu. Conditional Image Generation with PixelCNN Decoders, Jun. 18, 2016 (13 pages).
Alexey Dosovitskiy, Jost Tobias Springenberg, Thomas Brox, "Learning to Generate Chairs with Convolutional Neural Networks", CVPR, 2015 (9 pages).
Karol Gregor, Ivo Danihelka, Alex Graves, Danilo Jimenez Rezende, Daan Wierstra, "DRAW: A Recurrent Neural Network for Image Generation", ICML, 2015 (10 pages).
Ian J. Goodfellow, Jean Pouget-Abadie, Mehdi Mirza, Bing Xu, David Warde-Farley, Sherjil Ozair, Aaron Courville, Yoshua Bengio, Generative Adversarial Networks, NIPS, 2014 (9 pages).
Emily Denton, Soumith Chintala, Arthur Szlam, Rob Fergus, Deep Generative Image Models using a Laplacian Pyramid of Adversarial Networks, NIPS, 2015 (10 pages).
Lucas Theis, Aäron van den Oord, Matthias Bethge, "A note on the evaluation of generative models", ICLR 2016 (10 pages).
Zhenwen Dai, Andreas Damianou, Javier Gonzalez, Neil Lawrence, "Variationally Auto-Encoded Deep Gaussian Processes", ICLR 2016 (11 pages).
Elman Mansimov, Emilio Parisotto, Jimmy Ba, Ruslan Salakhutdinov, "Generating Images from Captions with Attention", ICLR 2016 (12 pages).
Jost Tobias Springenberg, "Unsupervised and Semi-supervised Learning with Categorical Generative Adversarial Networks", ICLR 2016 (20 pages).
Harrison Edwards, Amos Storkey, "Censoring Representations with an Adversary", ICLR 2016 (14 pages).
Takeru Miyato, Shin-ichi Maeda, Masanori Koyama, Ken Nakae, Shin Ishii, "Distributional Smoothing with Virtual Adversarial Training", ICLR 2016 (12 pages).
Jun-Yan Zhu, Philipp Krahenbuhl, Eli Shechtman, and Alexei A. Efros, "Generative Visual Manipulation on the Natural Image Manifold", ECCV 2016. (16 pages).
Alec Radford, Luke Metz, Soumith Chintala, "Unsupervised Representation Learning with Deep Convolutional Generative Adversarial Networks", ICLR 2016 (16 pages).
Scott Reed, Yi Zhang, Yuting Zhang, Honglak Lee, Deep Visual Analogy Making, NIPS, 2015 (9 pages).
Xiaolong Wang, David F. Fouhey, Abhinav Gupta, Designing Deep Networks for Surface Normal Estimation, CVPR, 2015 (9 pages).
Georgia Gkioxari, Jitendra Malik, Finding Action Tubes, CVPR, 2015 (10 pages).
Cong Zhang, Hongsheng Li, Xiaogang Wang, Xiaokang Yang, Cross-scene Crowd Counting via Deep Convolutional Neural Networks, CVPR, 2015 (9 pages).
Fang Wang, Le Kang, Yi Li, Sketch-based 3D Shape Retrieval using Convolutional Neural Networks, CVPR, 2015 (9 pages).
Samaneh Azadi, Jiashi Feng, Stefanie Jegelka, Trevor Darrell, "Auxiliary Image Regularization for Deep CNNs with Noisy Labels", ICLR 2016 (12 pages).
Leon A. Gatys, Alexander S. Ecker, Matthias Bethge, a Neural Algorithm of Artistic Style, Sep. 2, 2015 (16 pages).
Xucong Zhang, Yusuke Sugano, Mario Fritz, Andreas Bulling, Appearance-Based Gaze Estimation in the Wild, CVPR, 2015 (10 pages).
Yaniv Taigman, Ming Yang, MarcAurelio Ranzato, Lior Wolf, DeepFace: Closing the Gap to Human-Level Performance in Face Verification, CVPR, 2014 (8 pages).
Yi Sun, Ding Liang, Xiaogang Wang, Xiaoou Tang, DeepID3: Face Recognition with Very Deep Neural Networks, 2015 (5 pages).
Florian Schroff, Dmitry Kalenichenko, James Philbin, FaceNet: A Unified Embedding for Face Recognition and Clustering, CVPR, 2015 (10 pages).
Yue Wu, Tal Hassner, KangGeon Kim, Gerard Medioni, Prem Natarajan, Facial Landmark Detection with Tweaked Convolutional Neural Networks, 2015 (12 pages).
Yaniv Taigman et al., 2014, DeepFace: Closing the Gap to Human-Level Performance in Face Verification (8 pages).
Stanford, ThePageRank Citation Ranking: Bringing Order to the Web, Jan. 29, 1998, http://ilpubs.stanford.edu:8090/422/1/1999-66.pdf (17 pages).
Kaiming He, Xiangyu Zhang, Shaoqing Ren, Jian Sun, Deep Residual Learning for Image Recognition, arXiv:1512.03385, Dec. 10, 2015 (12 pages).
Kaiming He, Xiangyu Zhang, Shaoqing Ren, Jian Sun, Delving Deep into Rectifiers: Surpassing Human-Level Performance on ImageNet Classification, arXiv:1502.01852, Feb. 6, 2015 (11 pages).
Sergey Ioffe, Christian Szegedy, Batch Normalization: Accelerating Deep Network Training by Reducing Internal Covariate Shift, arXiv:1502.03167, Mar. 2, 2015 (11 pages).
Christian Szegedy, Wei Liu, Yangqing Jia, Pierre Sermanet, Scott Reed, Dragomir Anguelov, Dumitru Erhan, Vincent Vanhoucke, Andrew Rabinovich, Going Deeper with Convolutions, Sep. 17, 2014 (12 pages).
Karen Simonyan and Andrew Zisserman, Very Deep Convolutional Networks for Large-Scale Visual Recognition, ICLR, Apr. 10, 2015 (14 pages).
Alex Krizhevsky, Ilya Sutskever, Geoffrey E. Hinton, ImageNet Classification with Deep Convolutional Neural Networks, NIPS, 2012, (9 pages).
Kye-Hyeon Kim, Sanghoon Hong, Byungseok Roh, Yeongjae Cheon, Minje Park, PVANET: Deep but Lightweight Neural Networks for Real-time Object Detection, arXiv:1608.08021, Sep. 30, 2016 (7 pages).
Sermanet et al., OverFeat: Integrated Recognition, Localization and Detection using Convolutional Networks, ICLR, Feb. 24, 2014 (16 pages).

(56) References Cited

OTHER PUBLICATIONS

Ross Girshick, Jeff Donahue, Trevor Darrell, Jitendra Malik, Rich feature hierarchies for accurate object detection and semantic segmentation, CVPR, Oct. 22, 2014 (21 pages).
Kaiming He, Xiangyu Zhang, Shaoqing Ren, Jian Sun, Spatial Pyramid Pooling in Deep Convolutional Networks for Visual Recognition, Apr. 23, 2015 (14 pages).
Ross Girshick, Fast R-CNN, arXiv:1504.08083, Sep. 27, 2015 (9 pages).
Shaoqing Ren, Kaiming He, Ross Girshick, Jian Sun, Faster R-CNN: Towards Real-Time Object Detection with Region Proposal Networks, arXiv:1506.01497, Jan. 6, 2016 (14 pages).
Karel Lenc, Andrea Vedaldi, R-CNN minus R, arXiv:1506.06981, Jun. 23, 2015 (9 pages).
Russell Stewart, Mykhaylo Andriluka, End-to-end people detection in crowded scenes, arXiv:1506.04878, Jul. 8, 2015 (9 pages).
Joseph Redmon, Santosh Divvala, Ross Girshick, Ali Farhadi, You Only Look Once: Unified, Real-Time Object Detection, arXiv:1506.02640, May 9, 2016 (10 pages).
Joseph Redmon, Ali Farhadi, YOLO9000: Better, Faster, Stronger, Dec. 25, 2016 (9 pages).
Sean Bell, C. Lawrence Zitnick, Kavita Bala, Ross Girshick, Inside-Outside Net: Detecting Objects in Context with Skip Pooling and Recurrent Neural Networks, Dec. 14, 2015 (11 pages).
Cinbis et al., Weakly Supervised Object Localization with Multi-fold Multiple Instance Learning, Feb. 22, 2016 (15 pages).
Jifeng Dai, Yi Li, Kaiming He, Jian Sun, R-FCN: Object Detection via Region-based Fully Convolutional Networks, Jun. 21, 2016 (11 pages).
Wei Liu, Dragomir Anguelov, Dumitru Erhan, Christian Szegedy, Scott Reed, Cheng-Yang Fu, Alexander C. Berg, SSD: Single Shot MultiBox Detector, arXiv:1512.02325, Mar. 30, 2016 (15 pages).
Jonathan Huang, Vivek Rathod, Chen Sun, Menglong Zhu, Anoop Korattikara, Alireza Fathi, Ian Fischer, Zbigniew Wojna, Yang Song, Sergio Guadarrama, Kevin Murphy, Speed/Accuracy trade-off for modern convolutional object detectors, arXiv:1611.10012, Nov. 30, 2016 (20 pages).
Nicolas Ballas, Li Yao, Pal Chris, Aaron Courville, "Delving Deeper into Convolutional Networks for Learning Video Representations", ICLR, Mar. 1, 2016 (11 pages).
Michael Mathieu, camille couprie, Yann Lecun, "Deep Multi Scale Video Prediction Beyond Mean Square Error", ICLR, Feb. 26, 2016 (14 pages).
Seunghoon Hong, Tackgeun You, Suha Kwak, Bohyung Han, Online Tracking by Learning Discriminative Saliency Map with Convolutional Neural Network, arXiv:1502.06796, Feb. 24, 2015 (11 pages).
Hanxi Li, Yi Li and Fatih Porikli, DeepTrack: Learning Discriminative Feature Representations by Convolutional Neural Networks for Visual Tracking, BMVC, 2014 (12 pages).
N Wang, DY Yeung, Learning a Deep Compact Image Representation for Visual Tracking, NIPS, 2013 (9 pages).
Chao Ma, Jia-Bin Huang, Xiaokang Yang and Ming-Hsuan Yang, Hierarchical Convolutional Features for Visual Tracking, ICCV 2015 (9 pages).
Lijun Wang, Wanli Ouyang, Xiaogang Wang, and Huchuan Lu, Visual Tracking with fully Convolutional Networks, ICCV 2015 (9 pages).
Hyeonseob Nam and Bohyung Han, Learning Multi-Domain Convolutional Neural Networks for Visual Tracking, Jan. 6, 2016 (10 pages).
Sven Behnke: Learning Iterative Image Reconstruction. IJCAI, 2001 (6 pages).
Sven Behnke: Learning Iterative Image Reconstruction in the Neural Abstraction Pyramid. International Journal of Computational Intelligence and Applications, vol. 1, No. 4, pp. 427-438, 2001.
Chao Dong, Chen Change Loy, Kaiming He, Xiaoou Tang, Learning a Deep Convolutional Network for Image Super-Resolution, ECCV, 2014 (16 pages).
Chao Dong, Chen Change Loy, Kaiming He, Xiaoou Tang, Image Super-Resolution Using Deep Convolutional Networks, arXiv:1501.00092, Jul. 31, 2015 (14 pages).
Jiwon Kim, Jung Kwon Lee, Kyoung Mu Lee, Accurate Image Super-Resolution Using Very Deep Convolutional Networks, arXiv:1511.04587, 2015, Nov. 11, 2016 (9 pages).
Jiwon Kim, Jung Kwon Lee, Kyoung Mu Lee, Deeply-Recursive Convolutional Network for Image Super-Resolution, arXiv:1511.04491, 2015 (9 pages).
Zhaowen Wang, Ding Liu, Wei Han, Jianchao Yang and Thomas S. Huang, Deep Networks for Image Super-Resolution with Sparse Prior. ICCV, 2015 (10 pages).
Justin Johnson, Alexandre Alahi, Li Fei-Fei, Perceptual Losses for Real-Time Style Transfer and Super-Resolution, arXiv:1603.08155, 2016 (18 pages).
Christian Ledig, Lucas Theis, Ferenc Huszar, Jose Caballero, Andrew Cunningham, Alejandro Acosta, Andrew Aitken, Alykhan Tejani, Johannes Totz, Zehan Wang, Wenzhe Shi, Photo-Realistic Single Image Super-Resolution Using a Generative Adversarial Network, arXiv:1609.04802v3, 2016 (19 pages).
Osendorfer, Christian, Hubert Soyer, and Patrick van der Smagt, Image Super-Resolution with Fast Approximate Convolutional Sparse Coding, ICONIP, 2014 (9 pages).
Chao Dong, Yubin Deng, Chen Change Loy, Xiaoou Tang, Compression Artifacts Reduction by a Deep Convolutional Network, arXiv:1504.06993 Apr. 27, 2015 (9 pages).
Christian J. Schuler, Michael Hirsch, Stefan Harmeling, Bernhard Schölkopf, Learning to Deblur, arXiv:1406.7444, Jun. 28, 2014 (28 pages).
Jian Sun, Wenfei Cao, Zongben Xu, Jean Ponce, Learning a Convolutional Neural Network for Non-uniform Motion Blur Removal, CVPR, 2015 (9 pages).
Li Xu, Jimmy SJ. Ren, Ce Liu, Jiaya Jia, Deep Convolutional Neural Network for Image Deconvolution, NIPS, 2014 (9 pages).
Li Xu, Jimmy SJ. Ren, Qiong Yan, Renjie Liao, Jiaya Jia, Deep Edge-Aware Filters, ICML, 2015 (10 pages).
Jure Žbontar, Yann LeCun, Computing the Stereo Matching Cost with a Convolutional Neural Network, CVPR, 2015 (8 pages).
Richard Zhang, Phillip Isola, Alexei A. Efros, Colorful Image Colorization, ECCV, 2016, (29 pages).
Deepak Pathak, Philipp Krahenbuhl, Jeff Donahue, Trevor Darrell, Alexei A. Efros, Context Encoders: Feature Learning by Inpainting, CVPR, 2016 (12 pages).
Saining Xie, Zhuowen Tu, Holistically-Nested Edge Detection, arXiv:1504.06375 Oct. 4, 2015 (10 pages).
Gedas Bertasius, Jianbo Shi, Lorenzo Torresani, DeepEdge: A Multi-Scale Bifurcated Deep Network for Top-Down Contour Detection, CVPR, 2015 (10 pages).
Wei Shen, Xinggang Wang, Yan Wang, Xiang Bai, Zhijiang Zhang, DeepContour: A Deep Convolutional Feature Learned by Positive-Sharing Loss for Contour Detection, CVPR, 2015 (10 pages).
Alexander Kolesnikov, Christoph Lampert, Seed, Expand and Constrain: Three Principles for Weakly-Supervised Image Segmentation, ECCV, 2016.
Ziwei Liu, Xiaoxiao Li, Ping Luo, Chen Change Loy, Xiaoou Tang, Semantic Image Segmentation via Deep Parsing Network, arXiv:1509.02634 / ICCV 2015 (11 pages).
Iasonas Kokkinos, Pushing the Boundaries of Boundary Detection Using Deep Learning, arXiv:1411.07386 Jan. 22, 2016 (12 pages).
Jifeng Dai, Kaiming He, Jian Sun, BoxSup: Exploiting Bounding Boxes to Supervise Convolutional Networks for Semantic Segmentation, arXiv:1503.01640 May 18, 2015 (9 pages).
Hyeonwoo Noh, Seunghoon Hong, Bohyung Han, Learning Deconvolution Network for Semantic Segmentation, arXiv:1505.04366 May 17, 2015 (10 pages).
Seunghoon Hong, Hyeonwoo Noh, Bohyung Han, Decoupled Deep Neural Network for Semi-supervised Semantic Segmentation, arXiv:1506.04924 Jun. 17, 2015 (9 pages).
Seunghoon Hong, Junhyuk Oh, Bohyung Han, and Honglak Lee, Learning Transferrable Knowledge for Semantic Segmentation with Deep Convolutional Neural Network, arXiv:1512.07928, Dec. 24, 2015(13 pages).

(56) References Cited

OTHER PUBLICATIONS

Shuai Zheng, Sadeep Jayasumana, Bernardino Romera-Paredes, Vibhav Vineet, Zhizhong Su, Dalong Du, Chang Huang, Philip H. S. Torr, Conditional Random Fields as Recurrent Neural Networks, arXiv:1502.03240, Apr. 13, 2016 (17 pages).
Liang-Chieh Chen, George Papandreou, Kevin Murphy, Alan L. Yuille, Weakly-and semi-supervised learning of a DCNN for semantic image segmentation, arXiv:1502.02734 Oct. 5, 2015 (12 pages).
Mohammadreza Mostajabi, Payman Yadollahpour, Gregory Shakhnarovich, Feedforward Semantic Segmentation With Zoom-Out Features, CVPR, 2015 (10 pages).
Holger Caesar, Jasper Uijlings, Vittorio Ferrari, Joint Calibration for Semantic Segmentation, arXiv:1507.01581, Aug. 12, 2015 (15 pages).
Jonathan Long, Evan Shelhamer, Trevor Darrell, Fully Convolutional Networks for Semantic Segmentation, CVPR, 2015 (10 pages).
Bharath Hariharan, Pablo Arbelaez, Ross Girshick, Jitendra Malik, Hypercolumns for Object Segmentation and Fine-Grained Localization, CVPR, 2015 (10 pages).
Abhishek Sharma, Oncel Tuzel, David W. Jacobs, Deep Hierarchical Parsing for Semantic Segmentation, CVPR, 2015 (9 pages).
Clement Farabet, Camille Couprie, Laurent Najman, Yann LeCun, Scene Parsing with Multiscale Feature Learning, Purity Trees, and Optimal Covers, ICML, 2012 (8 pages).
Clement Farabet, Camille Couprie, Laurent Najman, Yann LeCun, Learning Hierarchical Features for Scene Labeling, PAMI, 2013 (15 pages).
Vijay Badrinarayanan, Alex Kendall and Roberto Cipolla "SegNet: A Deep Convolutional Encoder-Decoder Architecture for Image Segmentation." arXiv preprint arXiv:1511.00561, 2015 (14 pages).
Alex Kendall, Vijay Badrinarayanan and Roberto Cipolla "Bayesian SegNet: Model Uncertainty in Deep Convolutional Encoder-Decoder Architectures for Scene Understanding." arXiv preprint arXiv:1511.02680, 2015 (12 pages).
Fisher Yu, Vladlen Koltun, "Multi-Scale Context Aggregation by Dilated Convolutions", ICLR 2016 (9 pages).
Hamid Izadinia, Fereshteh Sadeghi, Santosh Kumar Divvala, Yejin Choi, Ali Farhadi, "Segment-Phrase Table for Semantic Segmentation, Visual Entailment and Paraphrasing", ICCV, 2015 (9 pages).
Iasonas Kokkinos, "Pusing the Boundaries of Boundary Detection Using deep Learning", ICLR 2016 (12 pages).
Niloufar Pourian, S. Karthikeyan, and B.S. Manjunath, "Weakly supervised graph based semantic segmentation by learning communities of image-parts", ICCV, 2015 (9 pages).
Nian Liu, Junwei Han, Dingwen Zhang, Shifeng Wen, Tianming Liu, Predicting Eye Fixations using Convolutional Neural Networks, CVPR, 2015 (9 pages).
Saurabh Singh, Derek Hoiem, David Forsyth, Learning a Sequential Search for Landmarks, CVPR, 2015 (9 pages).
Jimmy Lei Ba, Volodymyr Mnih, Koray Kavukcuoglu, Multiple Object Recognition with Visual Attention, ICLR, 2015 (10 pages).
Yaniv Taigman et al., 2015, Web-Scale Training for Face Identification (9 pages).
Yi Sun et al., 2014, Deep Learning Face Representation from Predicting 10,000 Classes (8 pages).
Yi Sun et al., 2014, Deep Learning Face Representation by Joint Identification-Verification (9 pages).
Yi Sun et al., 2014, Deeply learned face representations are sparse, selective, and robust (12 pages).
Yi Sun et al., 2015, DeepID3: Face Recognition with Very Deep Neural Networks (5 pages).
Florian Schroff et al., 2015, FaceNet: A Unified Embedding for Face Recognition and Clustering (9 pages).
Dong Yi et al., 2014, Learning Face Representation from Scratch (9 pages).
Xiang Wu et al., 2015, A Lightened CNN for Deep Face Representation (8 pages).
Xiang Wu et al., 2017, A Light CNN for Deep Face Representation with Noisy Labels, Journal of Latex class filed, vol. 14, No. 8, Aug. 2017 (13 pages).
Omkar M. Parkhi et al., 2015, Deep Face Recognition (12 pages).
Jingtuo Liu et al., 2015, Targeting Ultimate Accuracy: Face Recognition via Deep Embedding (5 pages).
Erjin Zhou et al., 2015, Naive-Deep Face Recognition: Touching the Limit of LFW Benchmark or Not? (5 pages).
Brandon Amos et al., 2016, OpenFace: A general-purpose face recognition library with mobile applications (20 pages).
Song Han et al., 2017, DSD: Dense-Sparse-Dense Training for Deep Neural Networks, published as a conference paper at ICLR 2017 (13 pages).
Pavlo Molchanov et al., 2017, Pruning Convolutional Neural Networks for Resource Efficient Transfer Learning, published as a conference paper at ICLR 2017(17 pages).
Song Han et al., 2016, Learning both Weights and Connections for Efficient Neural Networks (9 pages).
Yandong Wen et al., 2016, A Discriminative Feature Learning Approach for Deep Face Recognition (17 pages).
Weihua Chen et al., 2017, Beyond triplet loss: a deep quadruplet network for person re-identification (10 pages).
Xiao Zhang et al., 2016, Range Loss for Deep Face Recognition with Long-tail (10 pages).
Dong Chen et al., 2012, Bayesian Face Revisited: A Joint Formulation (14 pages).
Xudong Cao et al., 2013, A Practical Transfer Learning Algorithm for Face Verification (8 pages).
Gary B. et al., 2012, Labeled Faces in the Wild: A Database for Studying Face Recognition in Unconstrained Environments (11 pages).
D. Miller et al., 2015, MegaFace: A Million Faces for Recognition at Scale (10 pages).
Ira Kemelmacher-Shlizerman et al., 2016, The MegaFace Benchmark: 1 Million Faces for Recognition at Scale (10 pages).
Yandong Guo et al., 2016, MS-Celeb-1M: A Dataset and Benchmark for Large-Scale Face Recognition, published at ECCV 2016 (17 pages).
Weiyang Liu al., 2017, Large-Margin Softmax Loss for Convolutional Neural Networks(L-Softmax loss) (10 pages).
Weiyang Liu al., 2017, SphereFace: Deep Hypersphere Embedding for Face Recognition(A-Softmax loss) (13 pages).
Rajeev Ranjan al., 2017, L2-constrained Softmax Loss for Discriminative Face Verification (10 pages).
Yu Liu al., 2017, Rethinking Feature Discrimination and Polymerization for Large-scale Recognition(CoCo loss) (13 pages).
Feng Wang al., 2017, NormFace: L2 Hypersphere Embedding for Face Verification (11 pages).
Jiankang Deng al., 2018, ArcFace: Additive Angular Margin Loss for Deep Face Recognition (11 pages).
Abul Hasnat al., 2017, DeepVisage: Making face recognition simple yet with powerful generalization skills (12 pages).
Weiyang Liu al., 2017, SphereFace: Deep Hypersphere Embedding for Face Recognition (13 pages).
Feng Wang al., 2018, Additive Margin Softmax for Face Verification (7 pages).
Xianbiao al., 2018, Face Recognition via Centralized Coordinate Learning (14 pages).
Hao Wang al., 2018, CosFace: Large Margin Cosine Loss for Deep Face Recognition(Tencent AI Lab) (11 pages).
Sheng Chen al., 2018, MobileFaceNets: Efficient CNNs for Accurate Real-Time Face Verification on Mobile Devices (10 pages).
Donghyun Kim al., 2017, Deep 3D Face Identification (10 pages).
S. Z. Gilani al.,2018, Learning from Millions of 3D Scans for Large-scale 3D Face Recognition (11 pages).
Yu Liu al. ,2018, Exploring Disentangled Feature Representation Beyond Face Identification (13 pages).
International Preliminary Report on Patentability of PCT Application No. PCT/US2019/034232 dated Dec. 8, 2020, (7 pages).

(56) References Cited

OTHER PUBLICATIONS

Extended Search Report issued in European Patent Application No. 19816002.0 dated Feb. 14, 2022, 6 pages.

Huang, L. et al., "A scalable deep learning platform for identifying geologic features from seismic attributes", The Leading Edge, 2017, 36(3), pp. 249-256.

Jiang, Y., "Detecting Geological Structures in Seismic Volumes Using Deep Convolutional Neural Netowrks", Masters Thesis, Rheinisch-Westfalische Technische Hochschule Aachen, 2017, 76 pages.

Yao et al., User-Based and Item-Based Collaborative Filtering Recommendation Algorithms Design, Published 2015, Available at: https://cseweb.ucsd.edu/classes/wi15/cse255-a/reports/wi15/Guanwen%20Yao_Lifeng_Cai.pdf (7 pages).

Philipp Fischer, Alexey Dosovitskiy, Eddy Ilg, Philip Häusser, Caner Hazırbaş, Vladimir Golkov, Patrick van der Smagt, Daniel Cremers, Thomas Brox, FlowNet: Learning Optical Flow with Convolutional Networks, May 4, 2015; arXiv:1504.06852 (13 pages).

Guosheng Lin, Chunhua Shen, Ian Reid, Anton van dan Hengel, Efficient piecewise training of deep structured models for semantic segmentation, Jun. 6, 2016, arXiv:1504.01013 (10 pages).

Guosheng Lin, Chunhua Shen, Ian Reid, Anton van den Hengel, Deeply Learning the Messages in Message Passing Inference, Jun. 6, 2015, arXiv:1508.02108 (11 pages).

Junhua Mao, Wei Xu, Yi Yang, Jiang Wang, Alan L. Yuille, Explain Images with Multimodal Recurrent Neural Networks, Oct. 4, 1014, arXiv:1410.1090 (9 pages).

Ryan Kiros, Ruslan Salakhutdinov, Richard S. Zemel, Unifying Visual-Semantic Embeddings with Multimodal Neural Language Models, Nov. 10, 2014, arXiv:1411.2539 (13 pages).

Jeff Donahue, Lisa Anne Hendricks, Sergio Guadarrama, Marcus Rohrbach, Subhashini Venugopalan, Kate Saenko, Trevor Darrell, Long-term Recurrent Convolutional Networks for Visual Recognition and Description, May 31, 2016, arXiv:1411.4389 (14 pages).

Oriol Vinyals, Alexander Toshev, Samy Bengio, Dumitru Erhan, Show and Tell: A Neural Image Caption Generator, Apr. 20, 2015, arXiv:1411.4555 (9 pages).

Xinlei Chen, C. Lawrence Zitnick, Learning a Recurrent Visual Representation for Image Caption Generation, Nov. 20, 2014, arXiv:1411.5654 (10 pages).

EP Communication Pursuant to Article 94(3) EPC; Application No. 19816002.0-1001; Dated Feb. 8, 2024; 5 pages.

AU Examination Report No. 1; Application No. 2019281866; Dated Mar. 4, 2024; 4 pages.

* cited by examiner

GEOLOGICAL FEATURE SEARCH ENGINE

CROSS-REFERENCE TO RELATED APPLICATION

This application claims priority to U.S. Provisional Patent Application 62/681,632 filed on Jun. 6, 2018. The entirety of this provisional application is incorporated herein by reference.

BACKGROUND

In oil and gas exploration, explorers make use of analogues (e.g., well drilled in similar environments under similar conditions) to find new areas of exploration. At a high level, this means that the explorers may refer to databases of geological information about different areas, and compare the information to information gathered about a potential area for exploration. However, the datasets can be very large, and users typically may pick horizons within areas to look for geological features, which can make it difficult to capitalize on the large quantities of data that are already available.

SUMMARY

Embodiments of the present disclosure may provide computer-implemented method including receiving a geological feature search query identifying one or more geological features, executing, based on receiving the geological feature search query, a search of database storing a plurality of seismic data images. The seismic data images are labeled with geological features present in each of the plurality of seismic data images as part of a machine learning process. The method further includes determining, based on executing the search, search results, wherein the search results identify one more of the plurality of seismic data images having the one or more geological features identified in the geological feature search query, and outputting information regarding the search results.

Embodiments of the present disclosure may also provide a computing system having one or more processors, and a memory system comprising one or more non-transitory computer-readable media storing instructions thereon that, when executed, cause the computer system to perform operations. The operations include identifying one or more geological features included in each of a plurality of seismic data images by executing a machine learning process, storing, in a database, information identifying the one or more geological features included in each of the plurality of seismic data images, and receiving a geological feature search query identifying one or more geological features of interest. The operations further include executing, based on receiving the geological feature search query, a search of the database storing the information identifying the one or more geological features included in each of the plurality of seismic data images, determining, based on executing the search, search results identifying one more of the plurality of seismic data images having the one or more geological features of interest identified in the geological feature search query, and outputting information regarding the search results.

Embodiments of the present disclosure may also provide a non-transitory computer-readable medium storing instructions thereon that, when executed, cause a computer system to perform operations. The operations include receiving a plurality of training images that are each labeled with information identifying geological features present in each of the plurality of training images, identifying one or more geological features included in each of a plurality of operational seismic data images by executing a machine learning process using the plurality of training images, storing, in a database, information identifying the one or more geological features included in each of the plurality of operational seismic data images, and receiving a geological feature search query identifying one or more geological features of interest. The operations further include executing, based on receiving the geological feature search query, a search of the database storing the information identifying the one or more geological features included in each of the plurality of operational seismic data images, determining, based on executing the search, search results, wherein the search results identify one more of the plurality of operational seismic data images having the one or more geological features of interest identified in the geological feature search query, and outputting information regarding the search results.

Embodiments of the present disclosure may further provide a computing system configured to receive a geological feature search query identifying one or more geological features, execute, based on receiving the geological feature search query, a search of database storing a plurality of seismic data images, and determine, based on executing the search, search results. The search results identify one more of the plurality of seismic data images having the one or more geological features identified in the geological feature search query. The computer system is further configured to output information regarding the search results.

Thus, the computing systems and methods disclosed herein are more effective methods for processing collected data that may, for example, correspond to a surface and a subsurface region. These computing systems and methods increase data processing effectiveness, efficiency, and accuracy. Such methods and computing systems may complement or replace conventional methods for processing collected data. This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Figures 1A, 1B:
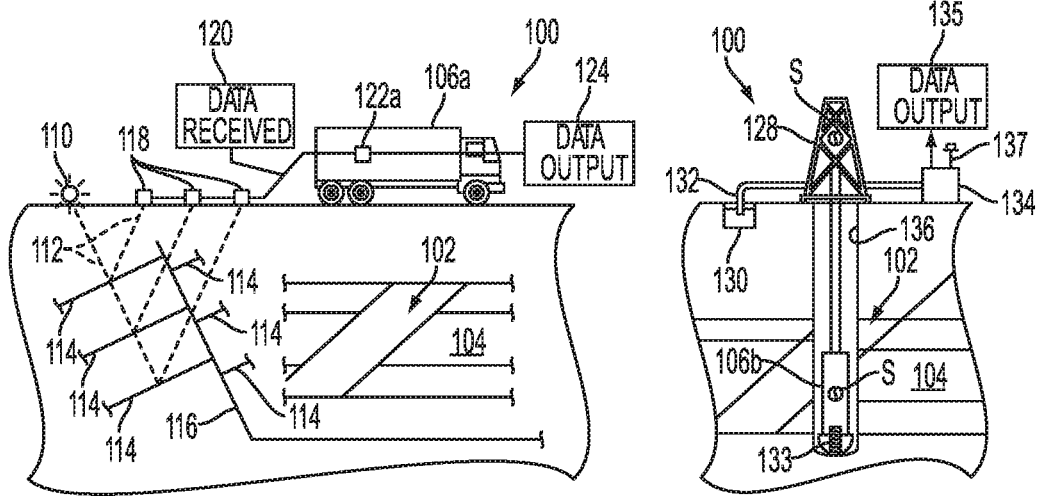
FIGS. 1A, 1B, 1C, 1D, 2, 3A, and 3B illustrate simplified, schematic views of an oilfield and its operation, according to an embodiment.

Systems and/or methods, described herein, may train a machine learning system to identify geological features included in seismic data images. The systems and/or methods may implement a search system in which one or more geological features may be searched in the seismic data images as identified by the trained machine learning system. In this way, a "play," representing a group of geological features, may be searched and identified in a group of seismic images. Examples of geological features that may be searched may include anticlines, toe-thrusts, horsts, terrain types, reservoirs, seals, source rocks, rock types, or the like. Data features that may be searched may include areas of noise in the data, (e.g. residual multiple, diffractions etc.), areas of poor imaging due to fault shadow, salt etc. and incorrect parameterization of seismic processing.

From play identification, geological areas having a group of geological features and attributes may be identified for further exploration. In other words, embodiments of the present disclosure may provide a system to rapidly search and screen through large volumes of seismic data, finding features of interest, and/or finding geographical areas where multiple features coexist. Accordingly, exploration decisions may be focused on those geographical areas having the features of interest. Further, aspects of the present disclosure may be used to identify a group of features representing hazardous areas for which exploration may be avoided, thereby improving safety of workers and equipment.

In some embodiments, the systems and/or methods may implement a ranking and/or filtering system to provide more relevant search results to a search query. In some embodiments, a "search result" may include to a "play" and may include a seismic data image having geological features of interest as defined by the search query. In this regard, any suitable ranking system may be used to rank and/or filter multiple search results. For example, a value representing the degree to which the seismic data image matches a search query (e.g., the degree to which the seismic data image includes the geological features of interest defined in the search query) may be used to rank search results. Additionally, or alternatively, a user profile may be accessed to determine a user's search preferences, job roles, and/or other information that may indicate the relevancy of search results to a target user. In some embodiments, collaborative filtering may be employed to filter and rank search results based on the search activity and search history of other similar user's indicative of search results that may be relevant to a target user. Additionally, or alternatively, certain geological features may be weighted more heavily than others for the purposes of ranking and/or filtering search results.

Aspects of the present disclosure may transform a subjective process into a computer-based decision processes through the use of rules. For example, search parameters included in a search query may serve as rules for identifying areas with particular seismic features. Further, machine learning algorithms and rules may be used to consistently and accurately identify features in seismic images and geological areas. In this way, feature identification is made consistent and objective through computer-based decisions rather than through subjective human interpretation. Aspects of the present disclosure may access and search a substantially large volume of seismic data images and datasets (e.g., thousands of images or more), which could not be practically performed without the use of the systems described herein. Further, aspects of the present disclosure may accurately identify plays in a matter of moments, thereby reducing the level of human labor and time inputs in the identification of plays. In some embodiments, aspects of the present disclosure may allow explorers to identify hazardous areas to avoid, thus improving worker and/or equipment safety.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106.1, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

Figures 1C, 1D:
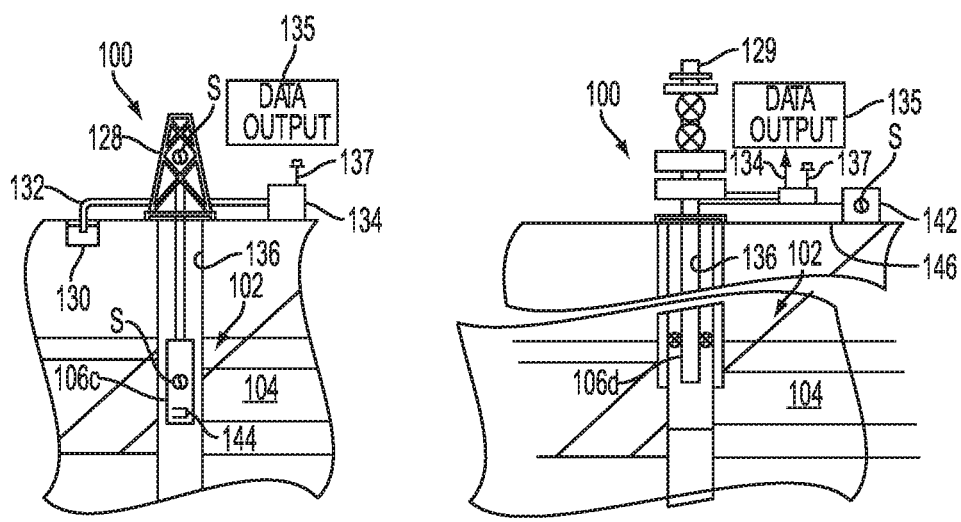

FIG. 1C illustrates a wireline operation being performed by wireline tool 106.3 suspended by rig 128 and into wellbore 136 of FIG. 1B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsite's for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

Figure 2:
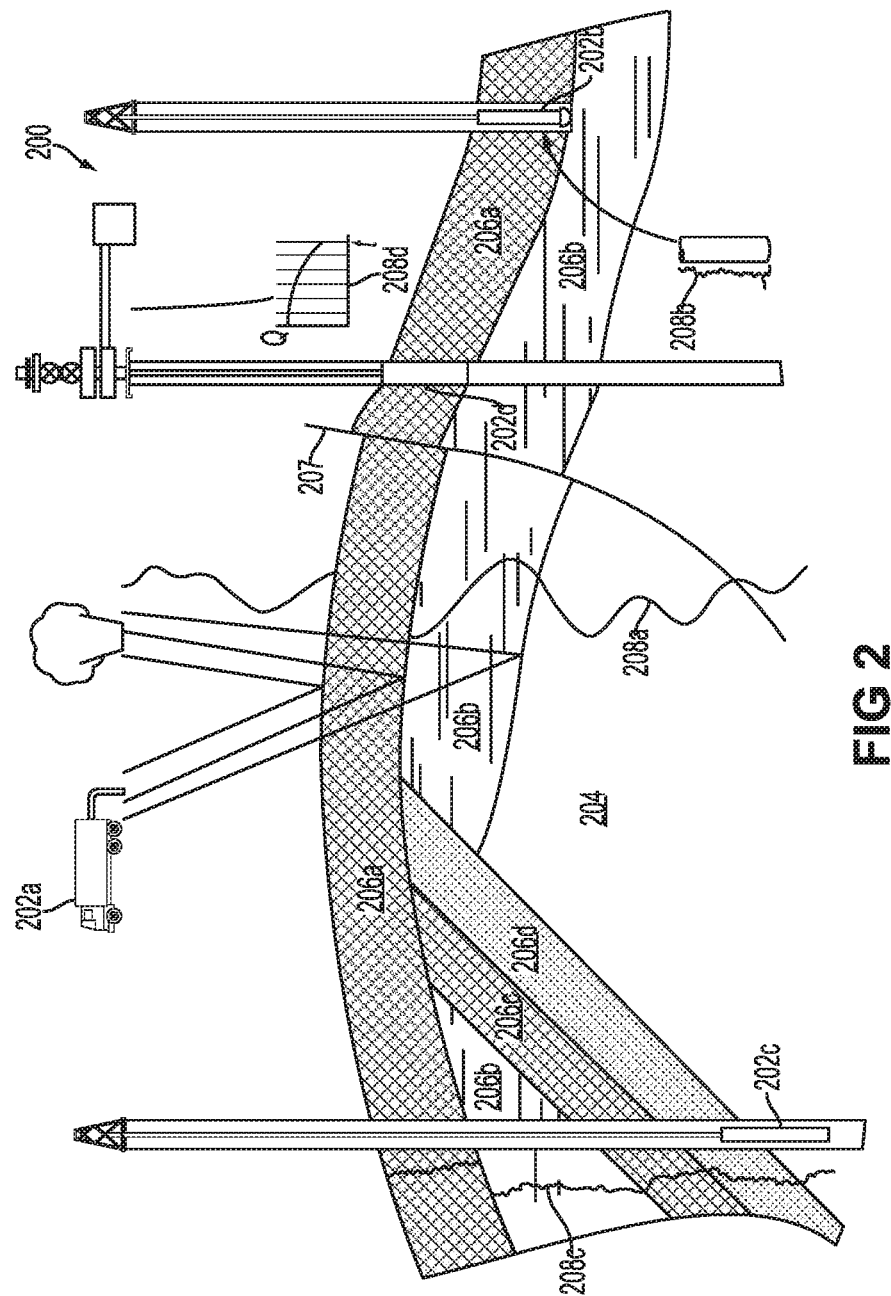

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1A-1D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that typically provides a resistivity or other measurement of the formation at various depths.

A production decline curve or graph 208.4 is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208.1 from data acquisition tool 202.1 is used by a geophysicist to determine characteristics of the subterranean formations and features. The core data shown in static plot 208.2 and/or log data from well log 208.3 are typically used by a geologist to determine various characteristics of the subterranean formation. The production data from graph 208.4 is typically used by the reservoir engineer to determine fluid flow reservoir characteristics. The data analyzed by the geologist, geophysicist and the reservoir engineer may be analyzed using modeling techniques.

Figure 3A:
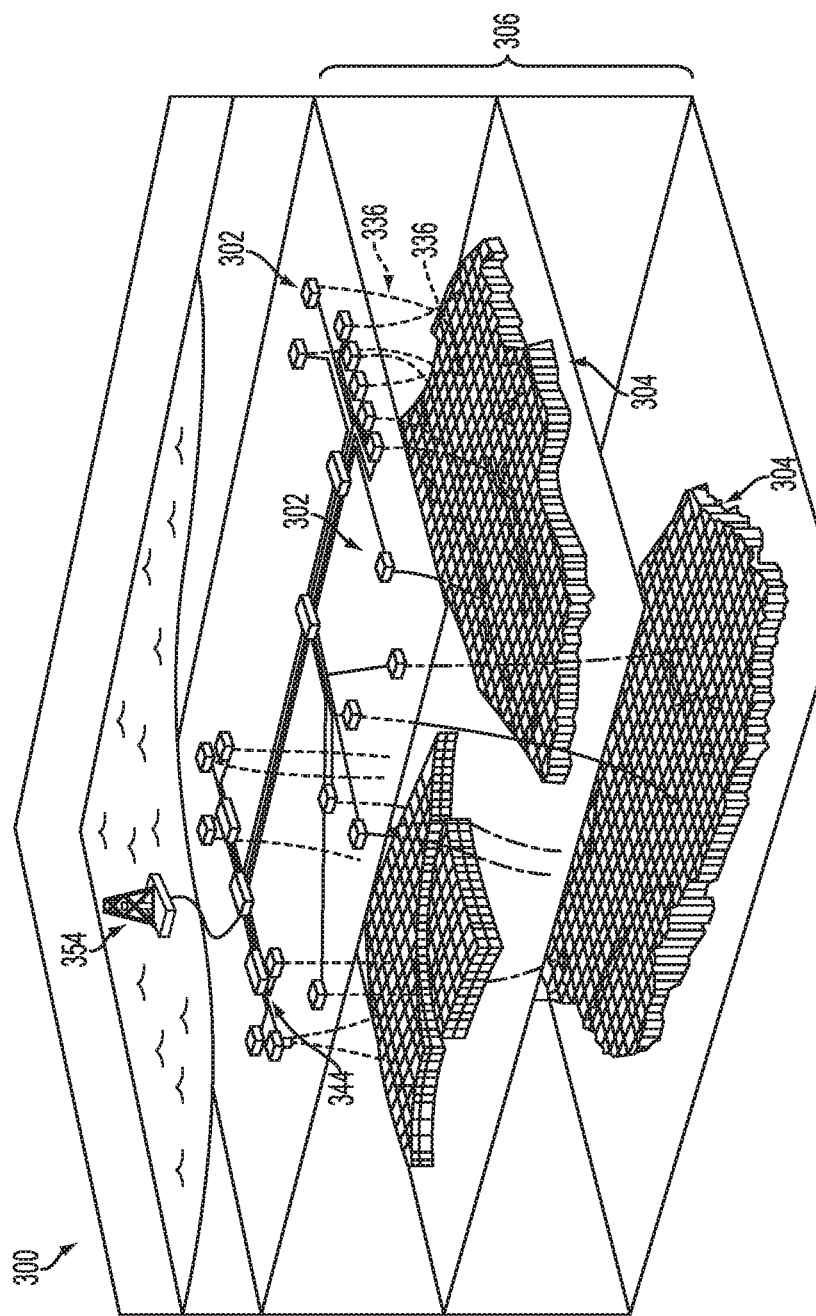

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
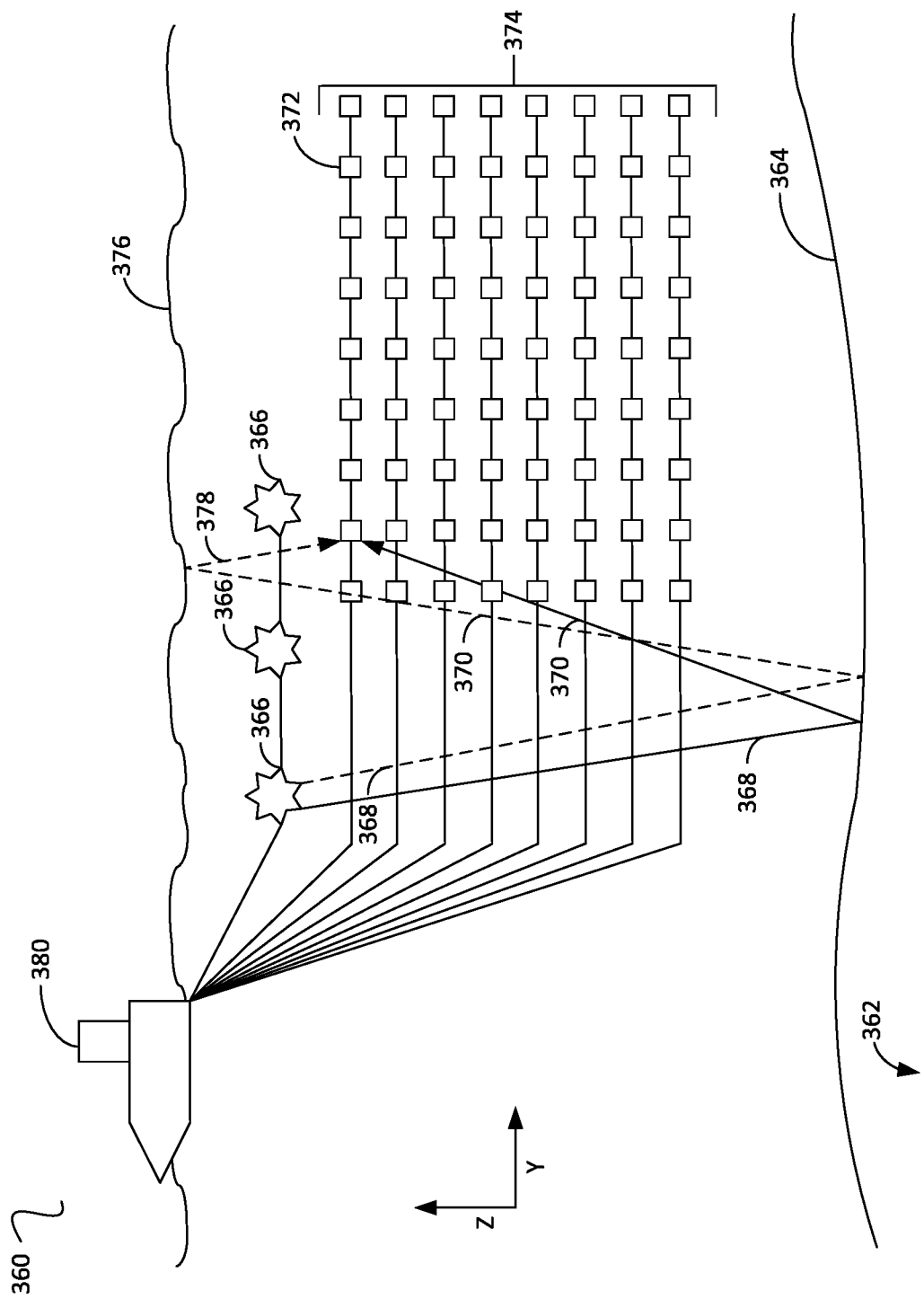

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Embodiments of the present disclosure may provide systems and methods for accessing information contained in large seismic data sets and delivering concise results that enhance the user experience. The user will also be able to leverage and access geoscience information to continue their analysis and trigger further workflows.

In some embodiments, the present disclosure may provide a search engine to quickly screen through large amounts of seismic data. Using such a search engine, the user can quickly find geological features that are similar to a particular seismic feature, and can receive a visualization of the distribution of the features spatially.

Embodiments of the present disclosure may employ any number and combination of image recognition technologies to identify the geological features in many images of seismic data. With the help of deep-learning models, a database of geo-feature images can be built and displayed on a map or in a 3D visualization window.

However, some searches might provide an overwhelming number of results. Accordingly, embodiments of the present disclosure may curate the results. For example, the present disclosure may include ranking the results, by which the system predicts the user's most desired result at the top. This can be done by employing any suitable combination of ranking algorithms. Additionally, recommendations from either item-based or user-based collaborative filtering can be provided. Further, a variety of above-ground factors can be used, such as client behavior analysis, news insight retrieval, government regulation, fiscal terms, license rounds, or others. Geoscience factors can also be used, and may include depth below mudline, size/scale of objects, proximity to discoveries, or other geoscience factors.

Further, embodiments of the present disclosure may provide limits on the results. For example, the user may choose to add limits/constraints to the attributes of the geological features e.g. size, depth below mudline, distance for other discoveries, distance from infrastructure etc. Embodiments of the disclosure may also combine results. For example, the user can then employ spatial searches to the sets of geological features, and can analyze their combined spatial distribution and to find potential play types.

In some embodiments, the present disclosure can rapidly find geological features and/or play elements such as reservoirs, seals, and source rock in relatively large data sets. Further, quick assessments of the value of seismic data, an area with 20 anticlines might have more potential than an area with five anticlines as input to pricing analytics tools may be provided. Finding rock types and their prevalence in large seismic processing may also be provided, e.g., to prioritize noise removal approaches. Finding geohazards/drilling hazards within in a seismic volume may further be provided. Embodiments of the disclosure may be used in combining data volumes/maps to find geological features, e.g., combining seismic and gravity, seismic and magnetics, seismic and pore pressure, seismic and any attribute volumes/basin models.

Embodiments may allow for leveraging different image recognition algorithms, and/or leveraging different ranking algorithms. Further, the present disclosure may facilitate finding features in shot gathers. Thus, embodiments of the present disclosure may enable rapid analysis of large volumes of data, and may be less sensitive to data quality than traditional automatic pickers, which often perform worse as data quality diminishes. This may accelerate and enhance accuracy in user's decisions on where to focus exploration efforts going forward.

Figure 4:
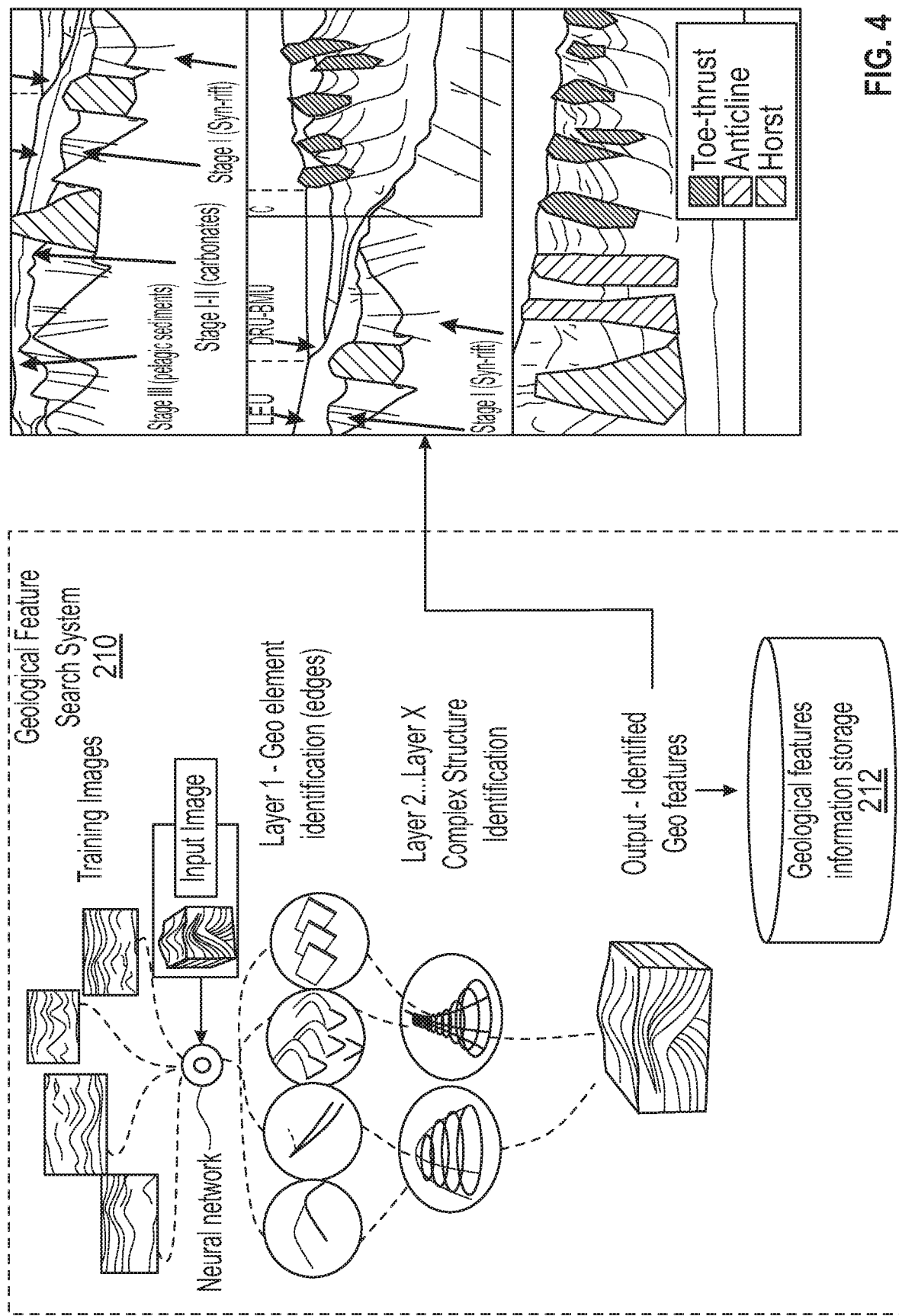
FIG. 4 illustrates a diagram of a machine learning training process for identifying geological features in input seismic data images, labeling the input seismic data images with geological features, and storing the labeled input seismic data images.

FIG. 4 illustrates a diagram of a machine learning training process for identifying geological features in input seismic data images, labeling the input seismic data images with geological features, and storing the labeled input seismic data images. As shown in FIG. 4, a geological feature search system 210 may train a neural network (or any other type of machine learning algorithm) having multiple layers using training images. Individual training images may be labeled with the type of geological features present, such as anticlines, toe-thrusts, horsts, terrain types, reservoirs, seals, source rocks, rock types, or the like. The training images may be used to train a multi-layer neural network implemented by the geological feature search system 210, and to identify the geological features present in seismic images of real-life seismic data.

In some embodiments, the geological feature search system 210 may receive an input or operational seismic image representing operational or real-life seismic data. The geological feature search system 210 may identify geological features in the seismic image using the multi-layer neural network (e.g., in which higher layers identify shape edges, and each subsequent layer identify more specific and complex structures and portions of image objects representing geological features). The seismic image with identified and labeled geological features may be stored in a database, such as the geological features information storage 212 and may be represented graphically in the form shown, or in a different form. In some embodiments, the geological features information may identify the types of geological features present in the seismic image (e.g., as determined using the multi-layer neural network). Additionally, the geological features information may include geological attributes associated with the features (e.g., geographical location of the features, distance between features, feature depth below mudline, size/scale, proximity to discoveries, etc.). Additionally, or alternatively, the geological features information may be used to identify non-geological attributes associated with the features, such as client behavior analysis information, news insights, government regulation information, fiscal terms of exploration, license requirements, etc. Such attributes may be received from an external source and may be linked with the geological attributes. In this way, the geological features information storage 212 may include a database that may store, for a given seismic data image, information identifying geological features, and that attributes of those geological features.

In some embodiments, multiple input seismic data images, representing real-life seismic data, may be received and analyzed using the trained multi-layer neural network to identify the geological features and attributes included in each input seismic data image. In this way, the geological features information storage 212 may store multiple seismic data images that are tagged and/or labeled with information identifying geological features (and attributes of those geological features within the seismic data images).

In some embodiments, the geological feature search system 210 may receive multiple input seismic data images, and for each seismic data image, the geological feature search system 210 may identify the geological features present in the seismic data images (e.g., using the trained, multi-level neural network), identify the attributes of the geological features, and store information (e.g., in the geological features information storage 212) linking the seismic image data with geological features and attributes of the features. As described in greater detail herein, the geological feature search system 210 may implement a search function to receive a search query. In some embodiments, the search query may identify one or more features and may also identify one or more constraints (e.g., attributes associated with the features). The search query may correspond to a "play" having features of interests and/or features with attributes of interest. The geological feature search system 210 may identify search results, which may include seismic data images having the searched features and matching the constraints. As described herein, a "search result" may include a seismic data image and the degree to which the seismic data image matches the search query (e.g., the degree to which the seismic data image includes the geological features and the attributes/constraints defined in the search query).

In some embodiments, the geological feature search system 210 may be trained based on other input data, in addition to, or instead of, seismic data images. For example, the geological feature search system 210 may be trained based on other types of images and datasets, such as inversion and attribute volumes.

Figure 5:
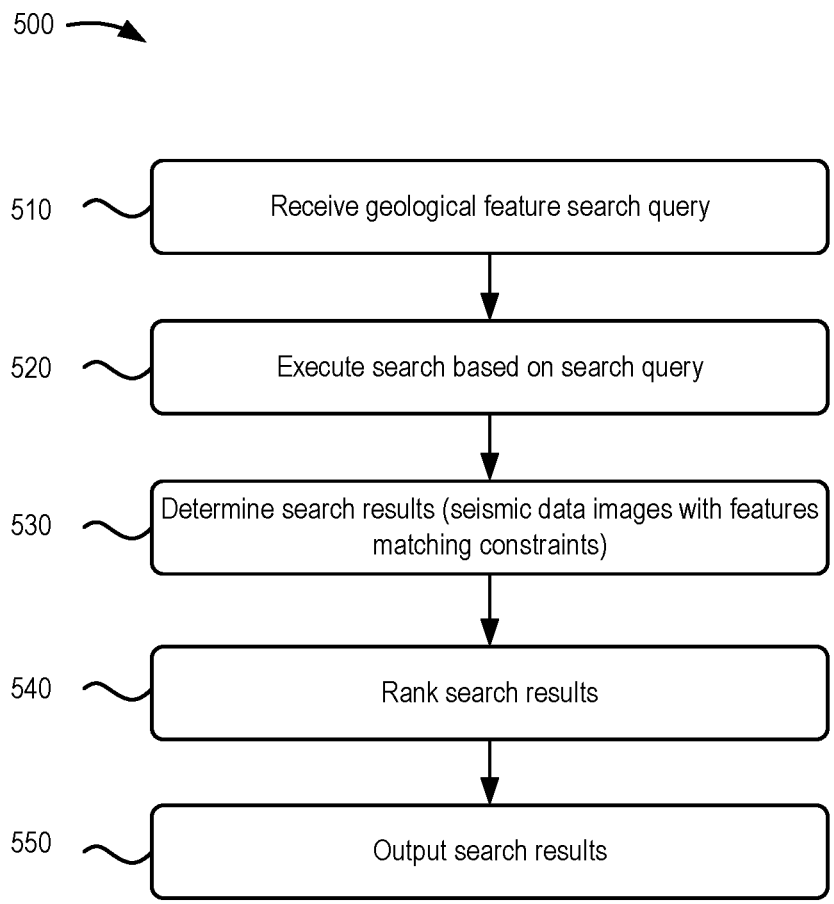
FIG. 5 shows an example flowchart of a process for identifying geological areas having features of interest using a machine learning-based search system.

FIG. 5 shows an example flowchart of a process 500 for identifying geological areas having features of interest using a machine learning-based search system. The steps of FIG. 5 may be implemented by the geological feature search system 210. The flowchart of FIG. 5 illustrates the architecture, functionality, and operation of possible implementations of systems, methods, and computer program products according to various embodiments of the present disclosure.

As shown in FIG. 5, the process 500 may include receiving a geological feature search query (e.g., at block 510). For example, the geological feature search system 210 may receive a search query containing one or more geological features. In some embodiments, the geological feature search system 210 may receive the search query from a target user via a user interface associated with an application, a webpage, or the like. The search query may include text entered by the target user, a selection of features in a seismic image, an image file of an image containing features, or other type of input identifying one or more geological features of interest. As described herein, examples of geological features that may be searched may include anticlines, toe-thrusts, horsts, terrain types, reservoirs, seals, source rocks, rock types, or the like. Additionally, or alternatively, a combination of seismic and volumes/basin models may be searched, such as seismic and gravity, seismic and magnetics, seismic and pore pressure, and/or seismic and any other volumes/basin model. Additionally, or alternatively, features that may be searched may include areas of noise in the data, (e.g. residual multiple, diffractions etc.), areas of poor imaging due to fault shadow, salt etc. and incorrect parameterization of seismic processing. In some embodiments, the search query may further include information identifying one or more constraints, such as geological attributes associated with the image (e.g., size, depth below mudline, distance for other discoveries, distance from infrastructure etc.). Additionally, or alternatively, the constraints may include non-geological attributes, such as client behavior analysis information, news insights, government regulation information, fiscal terms of exploration, license requirements, etc.

The process 500 may also include executing a search based on the search query (e.g., at block 520). For example, the geological feature search system 210 may execute a search by accessing the tagged and labeled seismic data images stored by the geological features information storage 212 and finding seismic data images having geological features and attributes that match the geological features and attributes from the search query. As previously discussed, the information stored by the geological features information storage 212 may be generated through machine learning techniques. In some embodiments, the information stored by the geological features information storage 212 may include seismic data images that are tagged and/or labeled with information identifying geological features (and attributes of those geological features) within the seismic data images.

The process 500 may further include determining search results (e.g., at block 530). For example, the geological feature search system 210 may determine search results, which may include seismic data images having geological features matching the constraints from the search query. In some embodiments, a "search result" may include a seismic data image which matches the search query to a threshold degree.

The process 500 may also include ranking the search results (e.g., at block 540). For example, the geological feature search system 210 may rank the search results using any combination of suitable ranking and/or filtering techniques. In some embodiments, the geological feature search system 210 may rank the search results based on value representing the degree to which the seismic data image matches a search query (e.g., the degree to which the seismic data image includes the geological features of interest defined in the search query). Additionally, or alternatively, the geological feature search system 210 may rank the search results based on a user profile may indicating the target user's search preferences, job roles, and/or other information that may indicate the relevancy of search results to the target user. In some embodiments, collaborative filtering may be employed to filter and rank search results based on the search activity and search history of other similar users indicative of search results that may be relevant to the target user. Additionally, or alternatively, certain geological features and/or attributes may be weighted more heavily than others for the purposes of ranking and/or filtering search results. In some embodiments, the geological feature search system 210 may determine a relevancy value or score based on one or more of the aforementioned ranking and/or filtering techniques, and may rank the search results based on the relevancy score.

The process 500 may further include outputting the search results (e.g., at block 550). For example, the geological feature search system 210 may output the search results in any combination of forms. In some embodiments, the search results may be presented as a list in which each search result identifies the seismic data image and related information (e.g., the geographic location associated with the seismic data image, the geological features and attributes present in the seismic data image, a relevancy value or score, etc.). In some embodiments, the search results may be presented graphically, such as on a geographic map in which the spatial distribution of the searched geographical features of interest are plotted and presented graphically with various colors and/or patterns. Additionally, or alternatively, the search results may be presented in other ways.

From the search results, locations having specific groups of geographic features of interest (e.g., corresponding to "plays") may be quickly identified for further exploration. For example, certain plays may be more suitable for certain types of explorations. By using the machine-learning based search system, described herein, explorers may quickly and accurately identify areas to focus for exploration. In a similar regard, hazardous areas with a group of hazardous geographic features and/or drilling hazards may be identified and avoided.

In some embodiments, a computer-based instruction may be executed based on the search results and/or based on its content. For example, a computer-based instruction may be executed to generate and send a report that presents the search results. Additionally, or alternatively, a computer-based instruction may be executed to generate an alert based on the search results identifying a new area of exploration and/or a hazardous area. Additionally, or alternatively, a computer-based instruction may be executed to modify a workflow or modify an exploration planning system.

Figure 6:
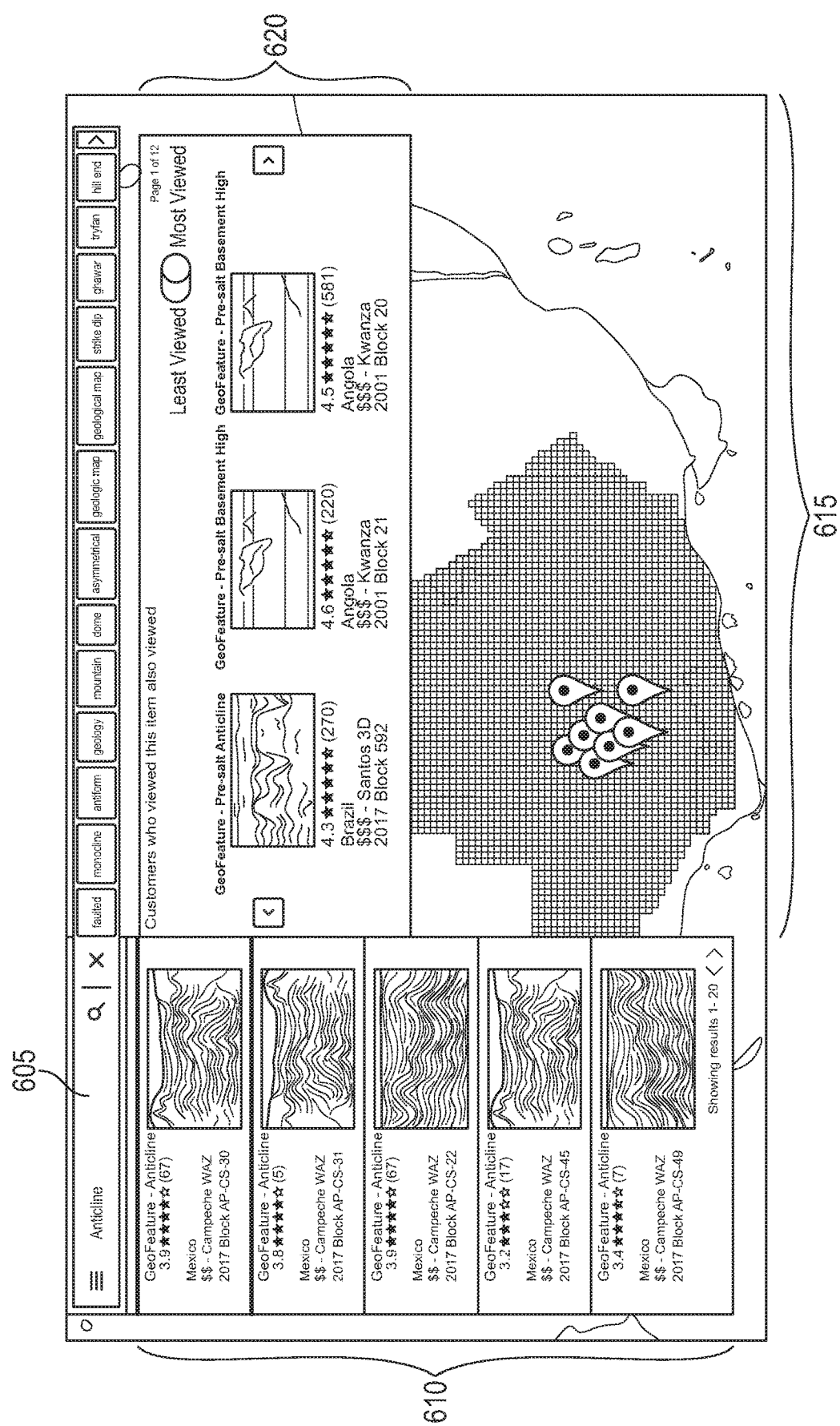
FIG. 6 illustrates a geological search interface for receiving search queries and presenting corresponding search results.

FIG. 6 illustrates a geological search interface for receiving search queries and presenting corresponding search results. As shown in FIG. 6, the geological search interface 600 may include a search query field 605, a search results list area 610, a search results map area 615, and related results area 620. In some embodiments, a user may enter a search query in the search query field 605 (e.g., the search query "anticline). The geological feature search system 210 may execute a search based on the search query to produce search results of seismic data images matching the search query (e.g., in a similar manner as described above with respect to the process 500 in FIG. 5). In some embodiments, the search results may be presented as a list (e.g., in the search results list area 610). In some embodiments, the search results may be listed in a ranked order along with a rating of relevancy (e.g., in the form of a relevancy percentage, or a value on a scale of 1-5 or other scale, etc.). Additionally, or alternatively, the search results may be presented in a map view in the search results map area 615 in which the search results are mapped to corresponding geographic locations. As further shown in the example of FIG. 6, the relevancy of each search result may be presented with a particular color, pattern, and/or shading. For example, different colors, patterns, shadings, etc. may represent varying levels of relevancy. In some embodiments, additional related seismic data images (e.g., related to the search results) may be presented in the related results area 620. For example, the related search results may include seismic data images viewed by others who viewed a target or selected seismic data image within the search results. Using the geological search interface 600, a user may quickly and accurately identify "plays" and areas having geological features of interest (or identify hazardous areas to avoid).

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 7:
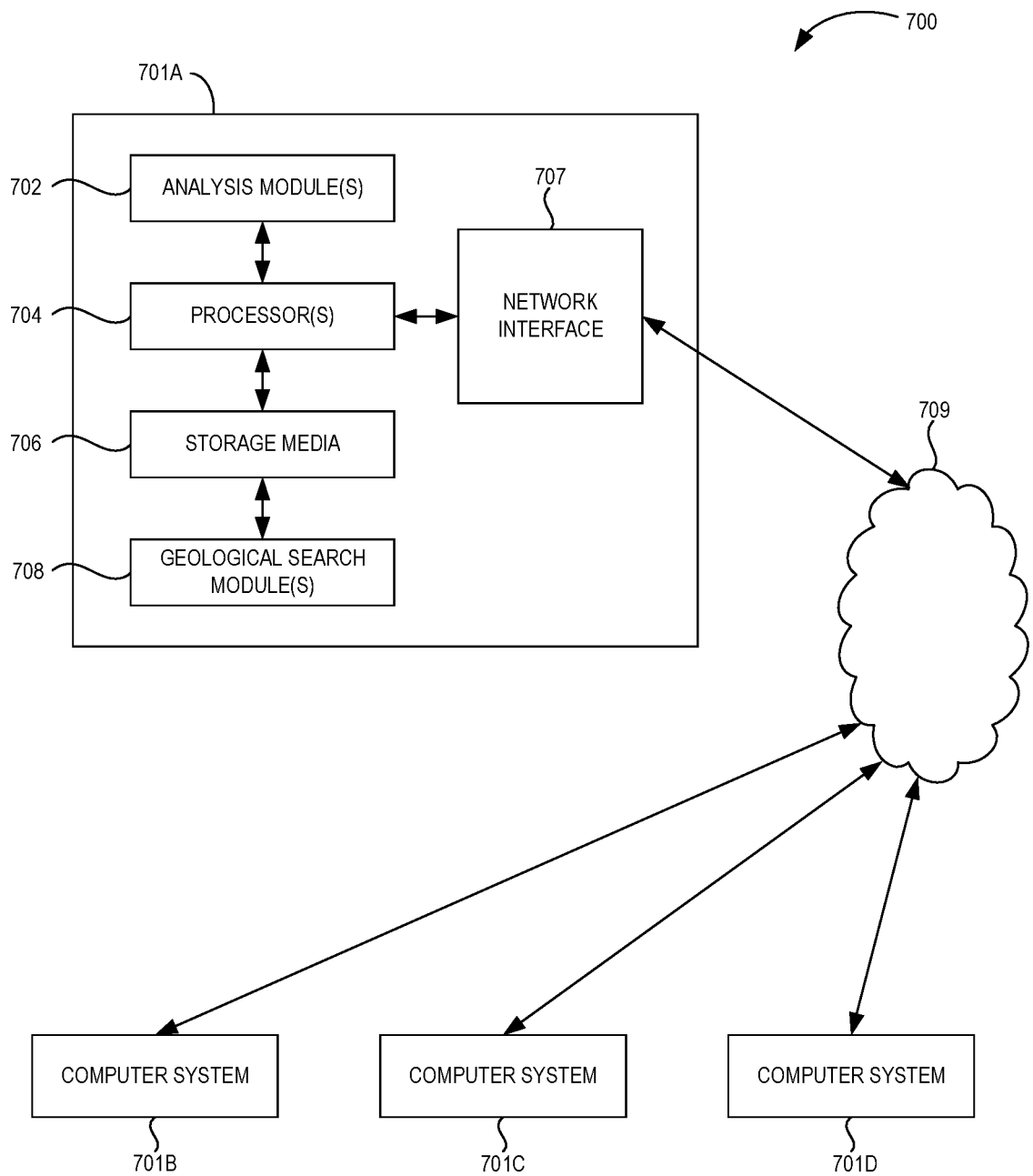
FIG. 7 illustrates a schematic view of a computing system, according to an embodiment.

In some embodiments, any of the methods of the present disclosure may be executed by a computing system. FIG. 7 illustrates an example of such a computing system 700, in accordance with some embodiments. The computing system 700 may include a computer or computer system 701A, which may be an individual computer system 701A or an arrangement of distributed computer systems. The computer system 701A includes one or more analysis module(s) 702 configured to perform various tasks according to some embodiments, such as one or more methods disclosed herein. To perform these various tasks, the analysis module 702 executes independently, or in coordination with, one or more processors 704, which is (or are) connected to one or more storage media 706. The processor(s) 704 is (or are) also connected to a network interface 707 to allow the computer system 701A to communicate over a data network 709 with one or more additional computer systems and/or computing systems, such as 701B, 701C, and/or 701D (note that computer systems 701B, 701C and/or 701D may or may not share the same architecture as computer system 701A, and may be located in different physical locations, e.g., computer systems 701A and 701B may be located in a processing facility, while in communication with one or more computer systems such as 701C and/or 701D that are located in one or more data centers, and/or located in varying countries on different continents).

A processor can include a microprocessor, microcontroller, processor module or subsystem, programmable integrated circuit, programmable gate array, or another control or computing device.

The storage media 706 can be implemented as one or more computer-readable or machine-readable storage media. Note that while in the example embodiment of FIG. 7 storage media 706 is depicted as within computer system 701A, in some embodiments, storage media 706 may be distributed within and/or across multiple internal and/or external enclosures of computing system 701A and/or additional computing systems. Storage media 706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 700 contains one or more geological feature searching module(s) 708. In the example of computing system 700, computer system 701A includes the geological feature searching module 708. In some embodiments, a single geological feature searching module may be used to perform some or all aspects of one or more embodiments of the methods. In alternate embodiments, a plurality of geological feature modules may be used to perform some or all aspects of methods.

It should be appreciated that computing system 700 is only one example of a computing system, and that computing system 700 may have more or fewer components than shown, may combine additional components not depicted in the example embodiment of FIG. 7, and/or computing system 700 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A computer-implemented method comprising:
receiving a geological feature search query identifying one or more geological features and one or more constraints associated with the one or more geological features, wherein the one or more constraints include geological attributes, and wherein the geological attributes comprise a depth below a mudline;
executing, based on receiving the geological feature search query, a search of a database storing a plurality of seismic data images, wherein executing the search further comprises searching images from a volume model or a basin model;
determining rock types present in the seismic data images, and selecting and implementing at least one of a plurality of noise removal techniques for the seismic data images based upon the determined rock types wherein the seismic data images are labeled with the one or more geological features present in each of the plurality of seismic data images as part of a machine learning process;
determining, based on executing the search, search results, wherein the search results identify one more of the plurality of seismic data images having the one or more geological features identified in the geological feature search query; and
outputting information regarding the search results to facilitate performing at least one of exploration of at least one geographical area having the features of interest and avoidance of at least one geographical area comprising features representing hazardous areas.

2. The method of claim 1, wherein the machine learning processes comprises using a multi-layer neural network.

3. The method of claim 1, wherein the machine learning process further comprises identifying the geological features present in each of the plurality of seismic data images based on identification of object edges and identification of portions of objects representing the geological features.

4. The method of claim 1, wherein the geological attributes also comprise
drilling hazards.

5. The method of claim 4, wherein the constraints comprise non-geological attributes, the non-geological attributes comprising at least one of:
client behavior analysis information;
news insights;
regulation information;
fiscal terms of exploration; or
license requirements.

6. The method of claim 1, further comprising ranking the search results based on at least one of:
a value representing the relevancy of the search results;
weightings of the one or more geological features;
constraints included in the geological search query;
user search preferences; or
collaborative filtering information.

7. The method of claim 1, wherein the geological feature search query comprises an identification of geological features of interest.

8. The method of claim 1, wherein the outputting information comprises presenting the search results as a geographic map, wherein the geographic map includes colors, patterns, or shadings representing varying levels of relevancy of the search results.

9. The method of claim 1, wherein the volume model or the basin model comprises a gravity model, a magnetic model, a pore pressure model, or a combination thereof.

10. The method of claim 1, wherein executing the search comprises searching areas of the seismic data images that comprise noise that is greater than a noise threshold, and wherein the noise comprises residual multiple or diffractions.

11. The method of claim 1, wherein executing the search comprises searching areas of the seismic data images that comprise imaging that is less than an imaging threshold, and wherein the imaging is less than the imaging threshold due to fault shadows or salt.

12. The method of claim 1, wherein executing the search comprises searching areas of the seismic data images where an incorrect parameterization of seismic processing occurred.

13. The method of claim 1, further comprising:
accessing a user profile to determine a user's search preferences and job roles; and
ranking the search results based upon the user's search preferences and job roles.

14. The method of claim 1, further comprising:
determining rock types in the plurality of seismic images;
selecting one of a plurality of noise removal techniques for the plurality of seismic images, wherein the selection is based upon the rock types;
accessing a user profile to determine a user's search preferences and job roles; and
ranking the search results based upon the user's search preferences and job roles,
wherein the geological attributes also comprise geohazards and drilling hazards to avoid when drilling a wellbore, and
wherein the one or more geological features comprise:
areas of noise;
areas of poor imaging due to a fault shadow and salt, and
incorrect parameterization of seismic processing.

15. A computer system, comprising:
one or more processors; and
a memory system comprising one or more non-transitory computer-readable media storing instructions thereon that, when executed, cause the computer system to perform operations, the operations comprising:
identifying one or more geological features included in each of a plurality of seismic data images by executing a machine learning process;
storing, in a database, information identifying the one or more geological features included in each of the plurality of seismic data images;
receiving a geological feature search query identifying one or more geological features of interest and one or more constraints associated with the one or more geological features of interest, wherein the one or more constraints include geological attributes, and wherein the geological attributes comprise a depth below a mudline;
executing, based on receiving the geological feature search query, a search of the database storing the information identifying the one or more geological features included in each of the plurality of seismic data images, wherein executing the search comprises searching the seismic data images and images from a volume model or a basin model;
determining rock types present in the seismic data images, and selecting and implementing at least one of a plurality of noise removal techniques for the seismic data images based upon the determined rock types;
determining, based on executing the search, search results, wherein the search results identify one more of the plurality of seismic data images having the one or more geological features of interest identified in the geological feature search query; and
outputting information regarding the search results to facilitate performing at least one of exploration of at least one geographical area having the features of interest and avoidance of at least one geographical area comprising features representing hazardous areas.

16. A non-transitory computer-readable medium storing instructions thereon that, when executed, cause a computer system to perform operations, the operations comprising:
receiving a plurality of training images that are each labeled with information identifying geological features present in each of the plurality of training images;
identifying one or more geological features included in each of a plurality of operational seismic data images by executing a machine learning process using the plurality of training images;
storing, in a database, information identifying the one or more geological features included in each of the plurality of operational seismic data images;
receiving a geological feature search query identifying one or more geological features of interest and one or more constraints associated with the one or more geological features of interest, wherein the one or more constraints include geological attributes, and wherein the geological attributes comprise a depth below a mudline;
executing, based on receiving the geological feature search query, a search of the database storing the information identifying the one or more geological features included in each of the plurality of operational seismic data images, wherein executing the search comprises searching the operational seismic data images and images from a volume model or a basin model;

determining rock types present in the operational seismic data images, and selecting and implementing at least one of a plurality of noise removal techniques for the operational seismic data images based upon the determined rock types;

determining, based on executing the search, search results, wherein the search results identify one more of the plurality of operational seismic data images having the one or more geological features of interest identified in the geological feature search query; and outputting information regarding the search results to facilitate performing at least one of exploration of at least one geographical area having the features of interest and avoidance of at least one geographical area comprising features representing hazardous areas.

17. The non-transitory computer-readable media of claim 16, wherein the machine learning process further comprises identifying the geological features present in each of the plurality of training images based on identification of object edges and identification of portions of objects representing the geological features.

18. The non-transitory computer-readable media of claim 16, wherein the operations further comprise ranking the search results based on at least one of:

a value representing the relevancy of the search results;
weightings of the one or more geological features;
constraints included in the geological search query;
user search preferences; or
collaborative filtering information.

19. The non-transitory computer-readable media of claim 16, wherein the outputting information comprises presenting the search results as a geographic map, wherein the geographic map includes colors, patterns, or shadings representing varying levels of relevancy of the search results.

* * * * *